(12) United States Patent
Koyama et al.

(10) Patent No.: US 9,765,671 B2
(45) Date of Patent: Sep. 19, 2017

(54) EXHAUST TREATMENT APPARATUS FOR ENGINE

(71) Applicant: KUBOTA Corporation, Osaka-shi, Osaka (JP)

(72) Inventors: Hideyuki Koyama, Sakai (JP); Tomoya Akitomo, Sakai (JP); Yuichi Tamaki, Sakai (JP); Ryutaro Komura, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 606 days.

(21) Appl. No.: 14/196,540

(22) Filed: Mar. 4, 2014

(65) Prior Publication Data

US 2014/0290226 A1 Oct. 2, 2014

(30) Foreign Application Priority Data

Mar. 29, 2013 (JP) ................................. 2013-073249

(51) Int. Cl.
*F01N 3/10* (2006.01)
*F01N 3/38* (2006.01)
(Continued)

(52) U.S. Cl.
CPC ................ *F01N 3/38* (2013.01); *F01N 3/025* (2013.01); *F01N 3/035* (2013.01); *F01N 3/2033* (2013.01);
(Continued)

(58) Field of Classification Search
CPC ...... F01N 13/0097; F01N 3/025; F01N 3/035; F01N 3/2033; F01N 3/38; F01N 2240/14; F01N 2260/022; F23G 7/065; F23G 7/07
(Continued)

(56) References Cited

U.S. PATENT DOCUMENTS 1,935,862 A * 11/1933 Tebaldi .................... H01T 13/34
  123/169 DW
1,962,079 A * 6/1934 Kegresse ................ H01T 13/16
  123/169 C
(Continued)

FOREIGN PATENT DOCUMENTS

DE 102011009620 A1 8/2012
DE WO 2012101041 A1 * 8/2012 ........... F01N 3/2066
(Continued)

OTHER PUBLICATIONS

Office Action issued Jul. 14, 2015 in JP Application No. 2013-073249.
(Continued)

*Primary Examiner* — Jason Shanske
*Assistant Examiner* — Matthew T Largi
(74) *Attorney, Agent, or Firm* — Panitch Schwarze Belisario & Nadel LLP (57) ABSTRACT

An engine exhaust treatment apparatus, which suppresses thermal damage to an electrothermal ignition apparatus, includes: an exhaust passage; an oxidation catalyst disposed in the exhaust passage; a combustible gas generator; a combustible gas supplying passage; a heat dissipation port opened upstream in the exhaust passage from the oxidation catalyst and in a downstream part of the combustible gas supplying passage, the exhaust passage and the combustible gas supplying passage communicating with each other through the heat dissipation port; and an electrothermal ignition apparatus disposed in the combustible gas supplying passage. Heat of flaming combustion of the combustible gas ignited by the electrothermal ignition apparatus is supplied to the exhaust passage, to raise the temperature of exhaust in the exhaust passage. A heat dissipation plate is attached to an outer projecting portion of the electrothermal ignition apparatus. The outer projecting portion projects outside a wall of the exhaust treatment apparatus.

10 Claims, 5 Drawing Sheets

(51) Int. Cl.
    *F01N 3/20*     (2006.01)
    *F01N 3/025*     (2006.01)
    *F01N 3/035*     (2006.01)
    *F01N 13/00*     (2010.01)
    *F23G 7/06*     (2006.01)
    *F23G 7/07*     (2006.01)
    *F23Q 7/06*     (2006.01)

(52) U.S. Cl.
    CPC ......... *F01N 13/0097* (2014.06); *F23G 7/065* (2013.01); *F23G 7/07* (2013.01); *F23Q 7/06* (2013.01); *F01N 2240/14* (2013.01); *F01N 2260/022* (2013.01); *Y02T 10/26* (2013.01)

(58) Field of Classification Search
    USPC ...................................... 60/295, 311
    See application file for complete search history.

(56) References Cited

U.S. PATENT DOCUMENTS

| | | | | |
|---|---|---|---|---|
| 2,273,651 A | * | 2/1942 | Lude | ........... H01T 13/34 |
| | | | | 123/169 C |
| 3,394,387 A | * | 7/1968 | Williams | ............... F02F 1/242 |
| | | | | 165/185 |
| 5,339,630 A | * | 8/1994 | Pettit | .................... F01N 3/2033 |
| | | | | 431/354 |
| 2005/0150217 A1 | * | 7/2005 | Crawley | ............... F01N 3/025 |
| | | | | 60/295 |
| 2013/0306156 A1 | * | 11/2013 | Mueller-Haas | ....... F01N 3/2066 |
| | | | | 137/1 |

FOREIGN PATENT DOCUMENTS

| | | |
|---|---|---|
| JP | 2009167950 A | 7/2009 |
| JP | 2012184731 A | 9/2012 |
| JP | 2012-188971 A | 10/2012 |
| JP | 2012-188972 A | 10/2012 |
| JP | 2012-188973 A | 10/2012 |
| JP | 2012-188974 A | 10/2012 |
| JP | 2013-189954 A | 9/2013 |
| JP | 2013-189955 A | 9/2013 |

OTHER PUBLICATIONS

Office Action issued Jun. 2, 2017 in CN Application No. 201410082089.0.

* cited by examiner

EXHAUST TREATMENT APPARATUS FOR ENGINE

BACKGROUND OF THE INVENTION

Field of the Invention

The invention relates to an exhaust treatment apparatus for an engine. Specifically, the invention relates to an exhaust treatment apparatus for an engine that suppresses thermal damage to an electrothermal ignition apparatus.

Description of Related Art

Conventionally, there exists an exhaust treatment apparatus for an engine structured as follows (e.g., see Japanese patent application (Kokai) JP 2012-188972 A (FIGS. 1A and 2)).

The exhaust treatment apparatus for an engine includes: an exhaust passage; an oxidation catalyst disposed in the exhaust passage; a combustible gas generator; a combustible gas supplying passage; a heat dissipation port opened upstream in the exhaust passage from the oxidation catalyst and in a downstream part in the combustible gas supplying passage, the exhaust passage and the combustible gas supplying passage communicating with each other through the heat dissipation port; and an electrothermal ignition apparatus disposed in the combustible gas supplying passage. Heat of flaming combustion of combustible gas ignited by the electrothermal ignition apparatus is supplied to the exhaust passage, to raise the temperature of exhaust in the exhaust passage.

The exhaust treatment apparatus of this type is advantageous in that, even when the temperature of exhaust is relatively low, the temperature of the exhaust is raised by heat of flaming combustion of combustible gas, whereby the oxidation catalyst can be activated.

However, this conventional technique is disadvantageous in that it does not have any unit that cools the electrothermal ignition apparatus.

Problem

The electrothermal ignition apparatus may be thermally damaged.

Since there is no unit that cools the electrothermal ignition apparatus, heat of exhaust or heat of combustion of combustible gas is accumulated in the electrothermal ignition apparatus. Accordingly, the electrothermal ignition apparatus may be thermally damaged.

BRIEF SUMMARY OF THE INVENTION

An object of the invention is to provide an exhaust treatment apparatus for an engine that suppresses thermal damage to an electrothermal ignition apparatus.

Figure 2A:
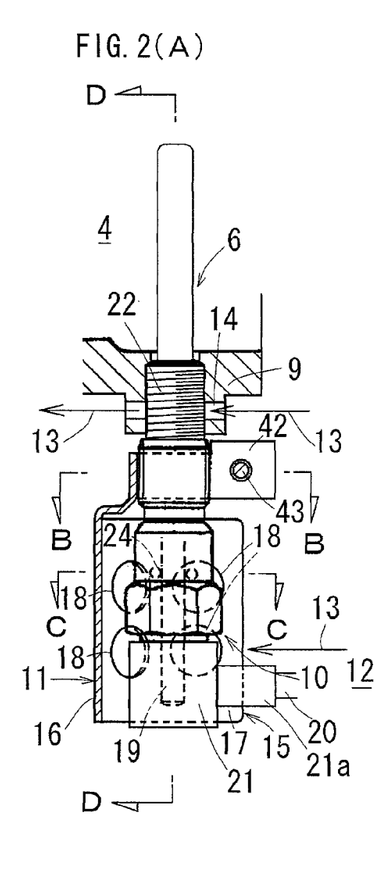
FIG. 2A is a cross-sectional side elevation of the electrothermal ignition apparatus and its surrounding shown in FIGS. 1A and 1B, FIG. 2B being a cross-sectional view taken along line B-B in FIG. 2A, FIG. 2C being a cross-sectional view taken along line C-C in FIG. 2A, and FIG. 2D being a cross-sectional view taken along line D-D in FIG. 2A.
Figures 2B, 2C, 2D:
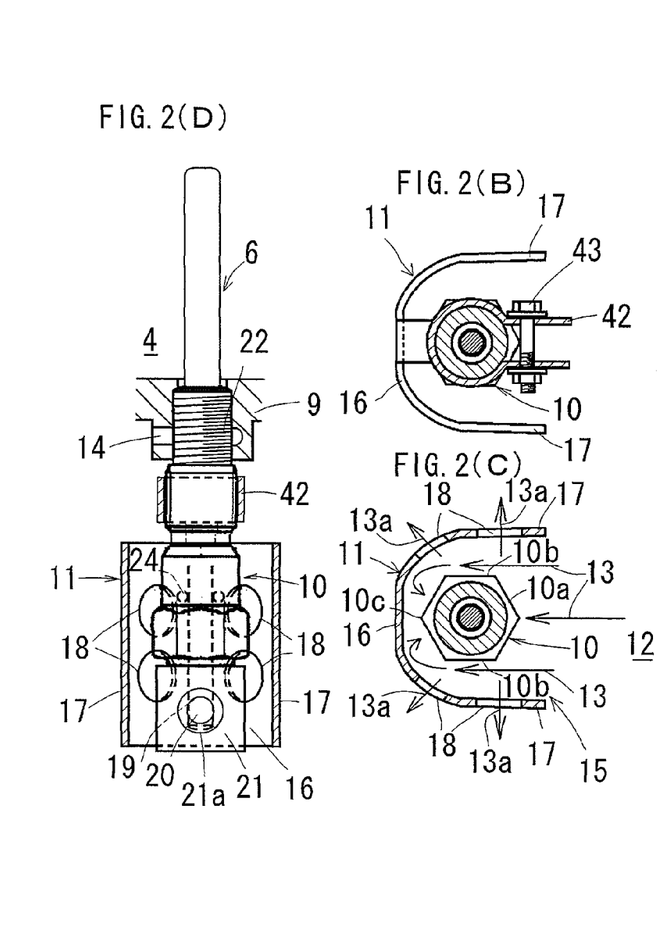
Figure 3:
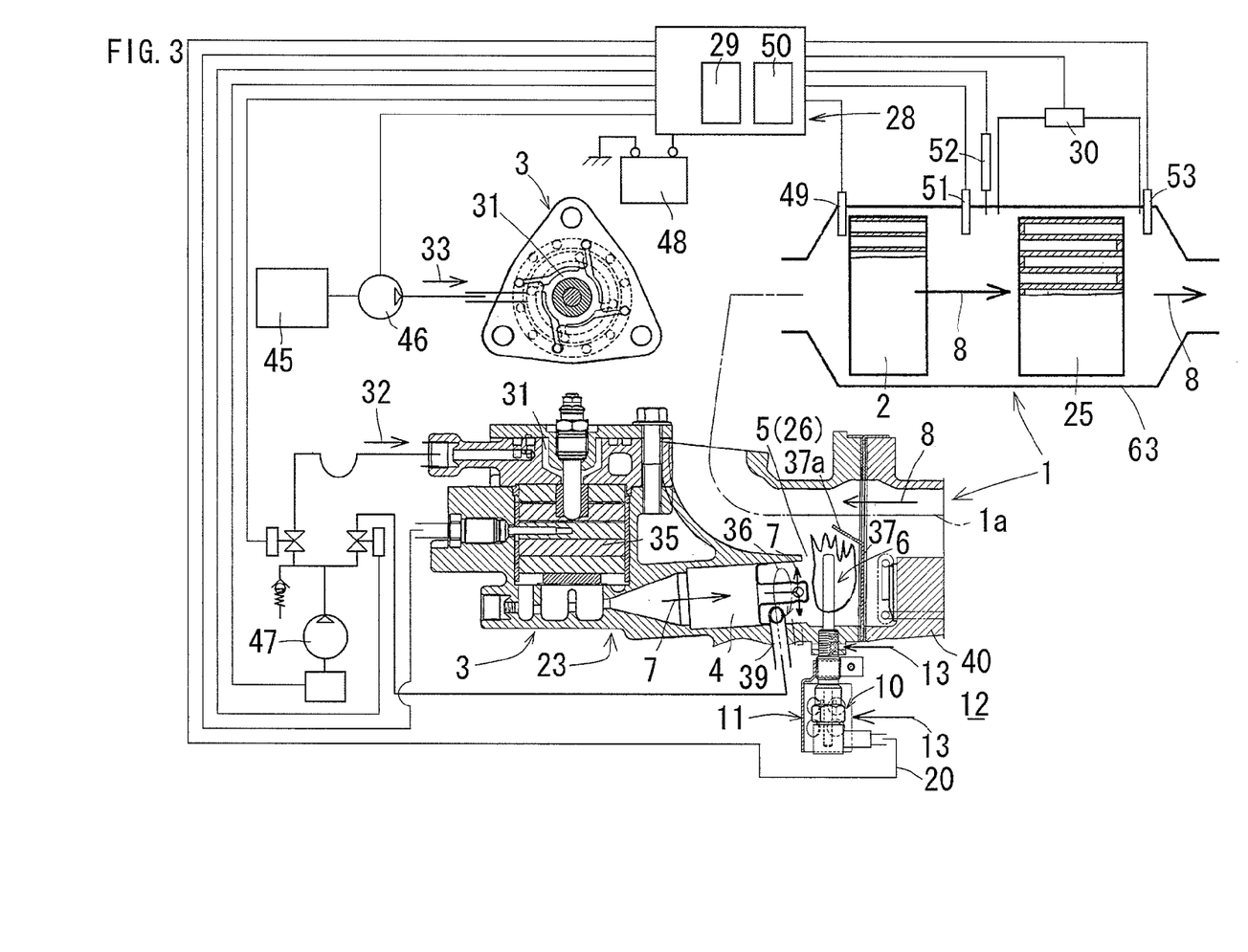
FIG. 3 is a schematic diagram of the exhaust treatment apparatus shown in FIGS. 1A and 1B.

Embodiments of the invention include the following features:

As illustrated in FIG. 3, an exhaust treatment apparatus for an engine includes: an exhaust passage (1); an oxidation catalyst (2) disposed in the exhaust passage (1); a combustible gas generator (3); a combustible gas supplying passage (4); a heat dissipation port (5) opened upstream in the exhaust passage (1) from the oxidation catalyst (2) and in a downstream part in the combustible gas supplying passage (4), the exhaust passage (1) and the combustible gas supplying passage (4) communicating with each other through the heat dissipation port (5); and an electrothermal ignition apparatus (6) disposed in the combustible gas supplying passage (4). Heat of flaming combustion of combustible gas (7) ignited by the electrothermal ignition apparatus (6) is supplied to the exhaust passage (1), to raise the temperature of exhaust (8) in the exhaust passage (1). As illustrated in FIGS. 2A to 2D, a heat dissipation plate (11) is attached to an outer projecting portion (10) of the electrothermal ignition apparatus (6), the outer projecting portion (10) projecting outside a wall (9) of the exhaust treatment apparatus.

Embodiments and aspects of the invention provide the following effect: Thermal damage to the electrothermal ignition apparatus is suppressed.

First Aspect

As illustrated in FIGS. 2A to 2D, the heat dissipation plate (11) is attached to the outer projecting portion (10) of the electrothermal ignition apparatus (6), the outer projecting portion (10) projecting outside the wall (9) of the exhaust treatment apparatus. Accordingly, heat of the exhaust (8) transferred to the electrothermal ignition apparatus (6) and heat of combustion of the combustible gas (7) are dissipated via the heat dissipation plate (11). Thus, thermal damage to the electrothermal ignition apparatus (6) is suppressed.

Second Aspect

As illustrated in FIG. 2A, cooling air (13) that passes through a cooling air passage (12) flows into a ventilation clearance (14), to blow in part of an insert portion (22) of the electrothermal ignition apparatus (6). Accordingly, heat of the exhaust (8) transferred to the electrothermal ignition apparatus (6) and heat of combustion of the combustible gas (7) are dissipated into the cooling air (13) that passes through the ventilation clearance (14). Thus, thermal damage to the electrothermal ignition apparatus (6) is suppressed.

Third Aspect

As illustrated in FIGS. 2A and 2C, the heat dissipation plate (11) is disposed in the cooling air passage (12), and the cooling air (13) passing through the cooling air passage (12) blows in the heat dissipation plate (11). Accordingly, heat of the exhaust (8) transferred to the electrothermal ignition apparatus (6) and heat of combustion of the combustible gas (7) are dissipated into the cooling air (13) via the heat dissipation plate (11). Thus, thermal damage to the electrothermal ignition apparatus (6) is suppressed.

Fourth Aspect

As illustrated in FIG. 2C, the heat dissipation plate (11) is bent to form a U-shape and may be bent to be angled. The outer projecting portion (10) of the electrothermal ignition apparatus (6) is surrounded by the heat dissipation plate (11). A ventilation entrance (15) of the heat dissipation plate (11) is provided in an upstream part in the cooling air passage (12). An air blocking wall (16) of the heat dissipation plate (11) is provided in a downstream part in the cooling air passage (12). Accordingly, the cooling air (13) flows into the space surrounded by the heat dissipation plate (11) from the ventilation entrance (15) of the heat dissipation plate (11). Part of the cooling air (13) hits an upstream face of the outer projecting portion (10) of the electrothermal ignition apparatus (6) to thereby cool the upstream face (10a). The cooling air (13) that passes through both sides of the outer projecting portion (10) cools both side faces (10b) and (10b) of the outer projecting portion (10). This cooling air (13) hits the air blocking wall (16) of the heat dissipation plate (11) and is inverted. Then, the cooling air (13) hits a downstream face (10c) of the outer projecting portion (10), to thereby cool the downstream face (10c). Thus, the outer projecting portion (10) of the electrothermal ignition apparatus (6) is strongly cooled, and thermal damage to the electrothermal ignition apparatus (6) is suppressed.

Fifth Aspect

As illustrated in FIGS. 2A and 2C, air discharging ports (18) and (18) are provided on both sidewalls (17) and (17) of the heat dissipation plate (11) extending from the air blocking wall (16) toward an upstream part in the cooling air passage (12). Accordingly, the cooling air (13) having cooled the outer projecting portion (10) of the electrothermal ignition apparatus (6) becomes hot discharged air (13a) and flows out from the air discharging ports (18) and (18). Therefore, the hot discharged air (13a) will not accumulate in the space surrounded by the heat dissipation plate (11), and the outer projecting portion (10) of the electrothermal ignition apparatus (6) is strongly cooled. Thus, thermal damage to the electrothermal ignition apparatus (6) is suppressed.

Sixth Aspect

The invention according to the sixth aspect provides the following effect in addition to the effect provided by the invention according to the fourth and fifth aspects: Thermal damage to a power feeder cord also is suppressed.

As illustrated in FIGS. 2A and 2D, a connection terminal (21) of a power feeder cord (20) is connected to a power input terminal (19) provided at the outer projecting portion (10) of the electrothermal ignition apparatus (6). The connection terminal (21) of the power feeder cord (20) is surrounded, together with the outer projecting portion (10) of the electrothermal ignition apparatus (6), by the heat dissipation plate (11). Accordingly, the connection terminal (21) of the power feeder cord (20) is also cooled by the cooling air (13) flowing into the space surrounded by the heat dissipation plate (11), and thermal damage to the power feeder cord (20) is also suppressed.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF PREFERRED EMBODIMENTS

FIGS. 1A to 5 are each an explanatory diagram of an exhaust treatment apparatus for an engine according to an embodiment of the invention. In the present embodiment, a description will be given of an exhaust treatment apparatus for a diesel engine.

As shown in FIG. 3, an oxidation catalyst (2) disposed in an exhaust passage (1), a combustible gas generator (3), and a combustible gas supplying passage (4) are provided. A heat dissipation port (5) is opened upstream in the exhaust passage (1) from the oxidation catalyst (2) and in a downstream part in the combustible gas supplying passage (4). The exhaust passage (1) and the combustible gas supplying passage (4) communicate with each other through the heat dissipation port (5). An electrothermal ignition apparatus (6) is disposed in the combustible gas supplying passage (4). The heat of flaming combustion of combustible gas (7) ignited by the electrothermal ignition apparatus (6) is supplied to the exhaust passage (1) to raise the temperature of exhaust (8) in the exhaust passage (1). In the drawing, (1a) indicates the center axis of the exhaust passage (1).

As shown in FIG. 3, the oxidation catalyst (2) is a DOC, which is disposed upstream from a DPF (25). DOC is an abbreviation of diesel oxidation catalyst, and DPF is an abbreviation of diesel particulate filter. In the present embodiment, when PM accumulates at the DPF (25), a DPF regeneration process is performed. That is, combustible gas (7) is generated by the combustible gas generator (3), and the combustible gas (7) is discharged from a combustible gas discharging port (26) to the exhaust passage (1) via the combustible gas supplying passage (4). The combustible gas (7) is caused to catalytically combust by the oxidation catalyst (2). Heat of the catalytic combustion raises the temperature of the exhaust (8), whereby the PM accumulated in the DPF (25) is removed by combustion. Thus, the DPF (25) is regenerated. In the case where the exhaust temperature at the entrance of the oxidation catalyst (2) has not reached the activation temperature of the oxidation catalyst (2), as described above, the combustible gas (7) is ignited by the electrothermal ignition apparatus (6). After the exhaust temperature at the entrance of the oxidation catalyst (2) is raised to reach the activation temperature of the oxidation catalyst (2), unignited combustible gas (7) is discharged from the combustible gas discharging port (26) to the exhaust passage (1).

PM is an abbreviation of particulate matter, which is contained in the exhaust. As shown in FIG. 3, a PM accumulation amount is estimated by a PM accumulation amount estimating apparatus (29) of an engine ECU (28). Engine ECU (28) stands for an engine electronic control unit, and the PM accumulation amount estimating apparatus (29) is a calculation unit of the engine ECU (28).

The PM accumulation amount estimating apparatus (29) estimates the PM accumulation amount from data mapping that is empirically obtained based on the differential pressure between the entrance and exit of the DPF (25) detected by a differential pressure sensor (30). When the PM accumulation amount estimation value has reached a predetermined DPF regeneration value, a DPF regeneration control apparatus (50) of the engine ECU (28) instructs to start the DPF regeneration process. The PM accumulation amount can be estimated based on the totalized value of the consumed fuel amount or the like.

With reference to FIG. 3, a fuel tank (45), a fuel pump (46), a blower (47), a battery (48), a DOC entrance side exhaust temperature sensor (49), a DPF entrance side exhaust temperature sensor (51), a DPF entrance side exhaust pressure sensor (52), and a DPF exit side exhaust temperature sensor (53) are provided.

Figures 1A, 1B:
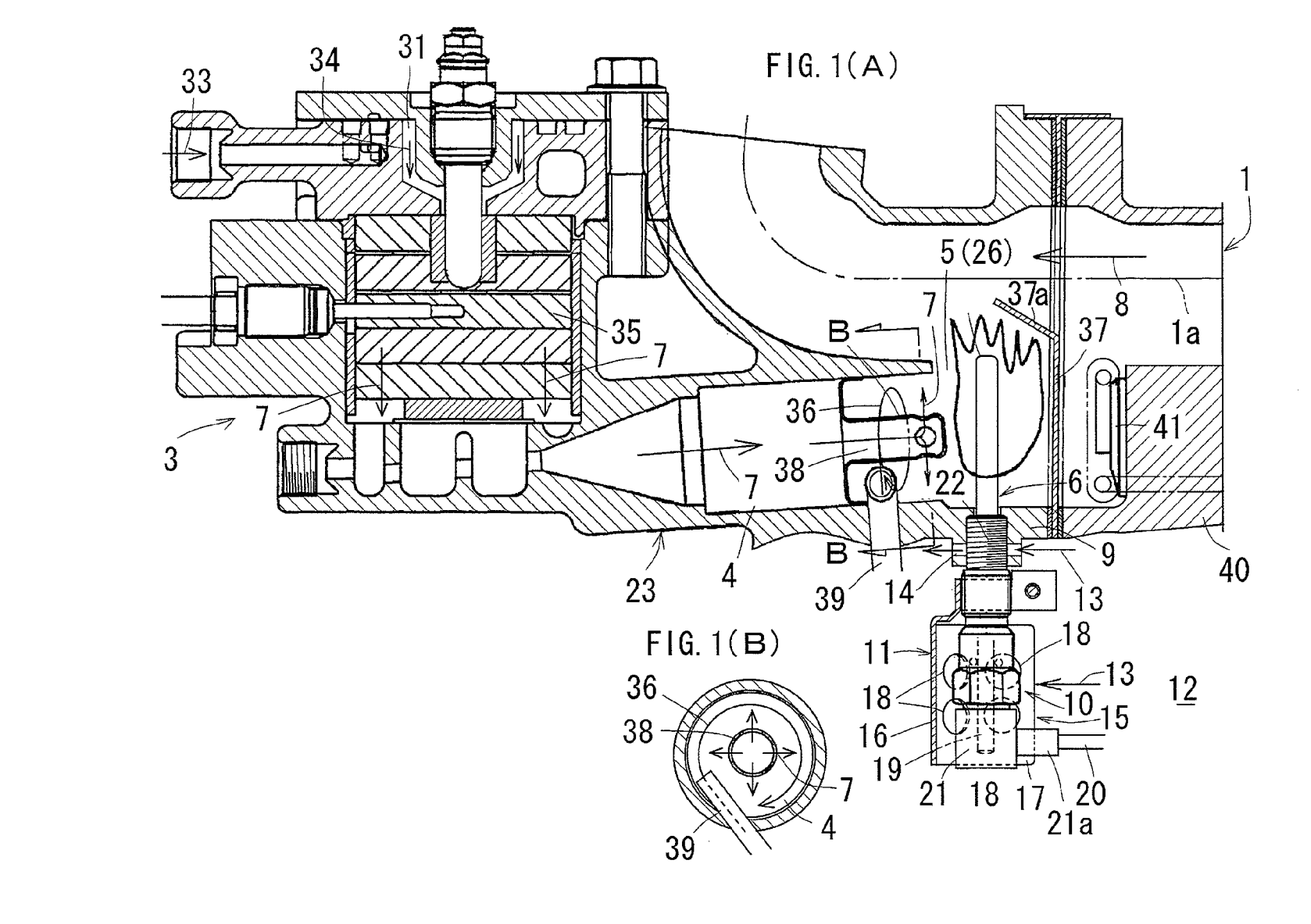
FIGS. 1A and 1B are each an explanatory diagram of an exhaust treatment apparatus for an engine according to an embodiment of the invention, FIG. 1A being a cross-sectional side elevation of the exhaust treatment apparatus, and FIG. 1B being a cross-sectional view taken along line B-B in FIG. 1A.

As shown in FIGS. 1A, 1B and 3, when the DPF is regenerated, in the combustible gas generator (3), an air-fuel mixture (34) of air (32) and liquid fuel (33) is formed in an air-fuel mixing chamber (31), and the air-fuel mixture (34) becomes combustible gas (7) by the combustible gas generating catalyst (35). The liquid fuel (33) is light oil, and the combustible gas generating catalyst (35) is an oxidation catalyst. Part of the liquid fuel (33) is catalytically combusted, and the remainder of the liquid fuel (33) is vaporized by heat of the catalytic combustion, to provide the combustible gas (7).

As shown in FIGS. 1A and 1B, the combustible gas (7) is mixed with secondary air (36) in the combustible gas supplying passage (4), and ignited by the electrothermal ignition apparatus (6) as necessary. The combustible gas (7) is radially emitted from a combustible gas nozzle (38) at the center of the combustible gas supplying passage (4) toward the inner circumferential face of the combustible gas supplying passage (4). The secondary air (36) is discharged from a secondary air nozzle (39) located on the inner circumferential face side in the combustible gas supplying passage (4), the secondary air (36) being discharged in the tangential direction of the inner circumferential face of the combustible gas supplying passage (4). Thus, the secondary air (36) that whirls along the inner circumferential face of the combustible gas supplying passage (4) and the combustible gas (7) discharged in the radial direction of the combustible gas supplying passage (4) are mixed with each other.

The electrothermal ignition apparatus (6) to be used is a glow plug. The electrothermal ignition apparatus (6) may be a sheathed heater or any other heater. A flame holding plate (37) is provided in the combustible gas supplying passage (4) downstream from the electrothermal ignition apparatus (6), so as to prevent the combustion flame of the combustible gas (7) ignited by the electrothermal ignition apparatus (6) from being blown off or diminished by the exhaust (8). The top end portion of the flame holding plate (37) projects into the exhaust passage (1), and tilts toward the downstream side of the exhaust passage (1). Thus, an increase in the back pressure is suppressed. The flame holding plate (37) is disposed between the electrothermal ignition apparatus (6) and a wastegate valve (41) of a turbocharger (40).

The combustible gas discharging port (26) is also referred to as the heat dissipation port (5).

As shown in FIGS. 2A to 2D, a heat dissipation plate (11) is attached to an outer projecting portion (10) of the electrothermal ignition apparatus (6), the outer projecting portion (10) projecting outside a wall (9) of the exhaust treatment apparatus.

Accordingly, heat of exhaust (8) transferred to the electrothermal ignition apparatus (6) and heat of combustion of combustible gas (7) are dissipated into cooling air (13) via the heat dissipation plate (11), and thermal damage to the electrothermal ignition apparatus (6) is suppressed. In particular, thermal damage to a sealing member such as an O-ring (24) in the electrothermal ignition apparatus (6) that tends to be influenced by heat can be suppressed. Thus, it becomes possible to prevent external entrance of water or dust that may be invited by a reduction in sealability.

As shown in FIGS. 2A and 2D, a ventilation clearance (14) is formed at the wall (9) of the exhaust treatment apparatus into which the electrothermal ignition apparatus (6) is inserted. Part of an insert portion (22) of the electrothermal ignition apparatus (6) inserted into the wall (9) of the exhaust treatment apparatus is exposed inside the ventilation clearance (14). The ventilation clearance (14) is disposed in a cooling air passage (12).

As shown in FIG. 2A, the cooling air (13) passing through the cooling air passage (12) flows into the ventilation clearance (14), and blows in part of the insert portion (22) of the electrothermal ignition apparatus (6).

Figure 4:
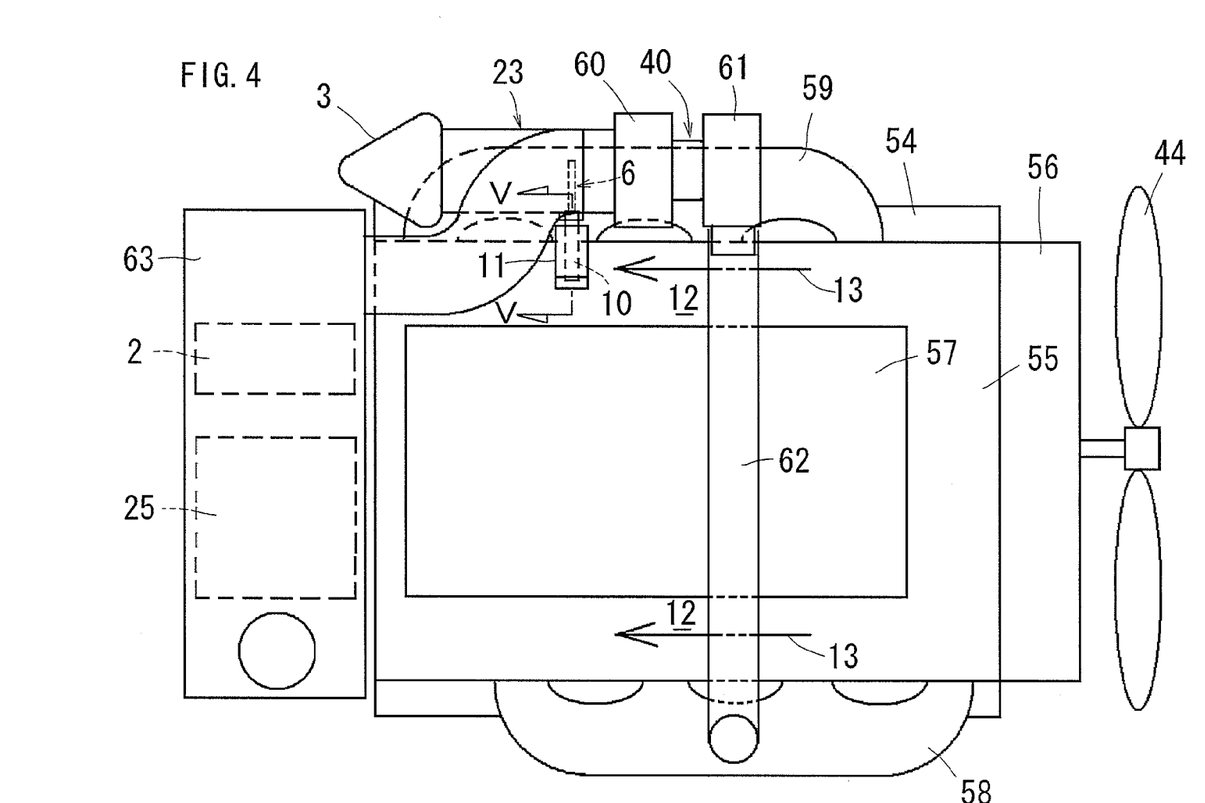
FIG. 4 is a schematic plan view showing a disposition example of the exhaust treatment apparatus and the electrothermal ignition apparatus shown in FIGS. 1A and 1B in an engine.

The cooling air passage (12) is an air passage of the cooling air (13) produced by an engine cooling fan (44) shown in FIG. 4. The cooling air passage (12) may be an air passage of cooling air produced by an electric fan.

As shown in FIGS. 2A and 2C, the heat dissipation plate (11) is disposed in the cooling air passage (12), and the cooling air (13) passing through the cooling air passage (12) blows in the heat dissipation plate (11).

As shown in FIGS. 2A and 2C, the heat dissipation plate (11) is bent to form a U-shape. The outer projecting portion (10) of the electrothermal ignition apparatus (6) is surrounded by the heat dissipation plate (11). A ventilation entrance (15) of the heat dissipation plate (11) is provided at an upstream part in the cooling air passage (12). An air blocking wall (16) of the heat dissipation plate (11) is provided at a downstream part in the cooling air passage (12). The heat dissipation plate (11) may be bent to be angled.

As shown in FIGS. 2A and 2C, air discharging ports (18) and (18) are formed at both sidewalls (17) and (17) of the heat dissipation plate (11) extending from the air blocking wall (16) toward an upstream part in the cooling air passage (12). The heat dissipation plate (11) is formed by sheet metal.

As shown in FIGS. 2A, 2B, and 2D, the heat dissipation plate (11) includes a clamp portion (42). The clamp portion (42) is externally fitted to the outer projecting portion (10) of the electrothermal ignition apparatus (6), and fastened by a fastening member (43). Thus, the heat dissipation plate (11) is attached to the electrothermal ignition apparatus (6).

The air discharging ports (18) and (18) are paired to form a column along the longitudinal direction of the outer projecting portion (10) of the electrothermal ignition apparatus (6). Two columns of air discharging ports (18) and (18) are disposed at each of the both sidewalls (17) and (17).

As shown in FIGS. 2A and 2D, a connection terminal (21) of a power feeder cord (20) is connected to a power input terminal (19) provided on the outer projecting portion (10) of the electrothermal ignition apparatus (6). The connection terminal (21) of the power feeder cord (20) is surrounded, together with the outer projecting portion (10) of the electrothermal ignition apparatus (6), by the heat dissipation plate (11).

A grip (21a) of the connection terminal (21) is inserted into the ventilation entrance (15). Thus, the connection terminal (21) is attached to or removed from the power input terminal (19) easily, without being hindered by the heat dissipation plate (11).

FIG. 4 shows a disposition example of the exhaust treatment apparatus and the electrothermal ignition apparatus in an engine.

In the engine, a cylinder head (55) is assembled above a cylinder block (54). A transmission case (56) is assembled in front of the cylinder block (54). A cylinder head cover (57) is assembled above the cylinder head (55). An intake manifold (58) is assembled on one side of the cylinder head (55), and an exhaust manifold (59) is assembled on other side of the cylinder head (55).

The turbocharger (40) is assembled above the exhaust manifold (59). An intake manifold (58) is connected to an air compressor (61) of the turbocharger (40) via a turbocharger pipe (62).

In front of the transmission case (56), the engine cooling fan (44) is disposed. The cooling air passages (12) and (12) are formed on both sides of the cylinder head cover (57), respectively.

As shown in FIG. 4, at the exhaust exit of an exhaust turbine (60) of the turbocharger (40), an exhaust treatment apparatus (23) is assembled. On the rear side of the cylinder head (55), an exhaust purifying case (63) that stores the oxidation catalyst (2) and the DPF (25) is disposed.

As shown in FIGS. 1A to 3, the electrothermal ignition apparatus (6) should be inserted upward from the wall (9) on the bottom side of the exhaust treatment apparatus (23), such that the outer projecting portion (10) of the electrothermal ignition apparatus (6) and the heat dissipation plate (11) are disposed in the cooling air passage (12) shown in FIG. 4.

Figure 5:
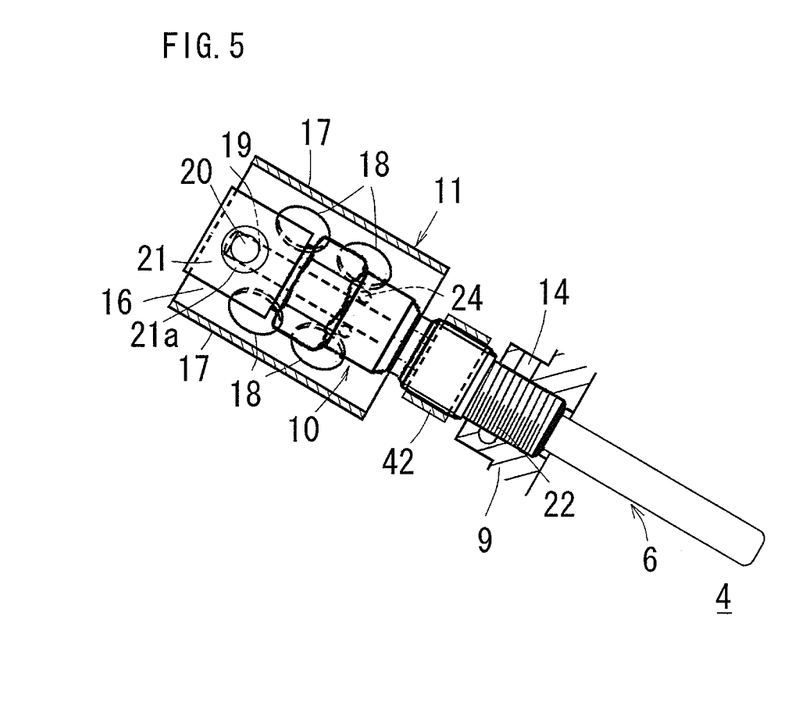
FIG. 5 is a cross-sectional view taken along line V-V in FIG. 4.

FIGS. 4 and 5 each show a disposition example in which the electrothermal ignition apparatus (6) is inserted diagonally downward from the sidewall (9) of the exhaust treatment apparatus (23), and the outer projecting portion (10) and the heat dissipation plate (11) of the electrothermal ignition apparatus (6) are disposed in the cooling air passage (12).

In the present embodiment, the following scheme may be employed.

When the DPF (25) is to be regenerated, if the temperature of the exhaust (8) is less than a predetermined reference temperature, a control apparatus executes a gas igniting process at low temperatures. In the gas igniting process at low temperatures, the electrothermal ignition apparatus (6) ignites the combustible gas (7), and heat of flaming combustion of the combustible gas (7) is supplied to the exhaust passage (1). The control apparatus is the engine ECU (28).

When a predetermined amount of PM has accumulated at the oxidation catalyst (2), the control apparatus executes the regeneration process of the oxidation catalyst (2). In the regeneration process of the oxidation catalyst (2), the combustible gas generator (3) generates combustible gas (7). The electrothermal ignition apparatus (6) ignites the combustible gas (7). Heat of flaming combustion of the combustible gas (7) is supplied to the exhaust passage (1). The exhaust temperature on the entrance side of the oxidation catalyst (2) is raised to be higher than that in the gas igniting process at low temperatures, whereby the PM accumulated in the oxidation catalyst (2) is removed by combustion.

In the gas igniting process at low temperatures, as the temperature of the exhaust (8) is lower and the engine speed is higher, the control apparatus sets the voltage applied to the electrothermal ignition apparatus (6) to be higher. Also, as the ambient temperature of the electrothermal ignition apparatus (6) is higher, the control apparatus greatly lowers the set voltage. Thus, thermal damage to the electrothermal ignition apparatus (6) is suppressed.

Further, when the oxidation catalyst (2) is to be regenerated also, similar voltage management of the electrothermal ignition apparatus (6) is performed. The control apparatus is associated with an engine speed sensor (not shown), a sensor (not shown) that detects the ambient temperature of the electrothermal ignition apparatus (6), and a sensor (not shown) that detects the exhaust pressure upstream from the oxidation catalyst (2). Thus, the engine speed, the ambient temperature of the electrothermal ignition apparatus (6), and the PM accumulation amount at the oxidation catalyst (2) can be detected.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An exhaust treatment apparatus for an engine comprising:
   a wall;
   an exhaust passage;
   an oxidation catalyst disposed in the exhaust passage;
   a combustible gas generator;
   a combustible gas supplying passage;
   a cooling air passage;
   a heat dissipation port opened upstream in the exhaust passage from the oxidation catalyst and in a downstream part in the combustible gas supplying passage, the exhaust passage and the combustible gas supplying passage communicating with each other through the heat dissipation port; and
   an electrothermal ignition apparatus having an outer projecting portion and disposed in the combustible gas supplying passage, wherein heat of flaming combustion of combustible gas ignited by the electrothermal ignition apparatus is supplied to the exhaust passage, to raise a temperature of exhaust in the exhaust passage,
   the exhaust treatment apparatus for an engine further comprising:
   a heat dissipation plate attached to an outer projecting portion of the electrothermal ignition apparatus, the outer projecting portion projecting outside the wall of the exhaust treatment apparatus,
   wherein the heat dissipation plate is disposed in the cooling air passage, the outer projecting portion of the electrothermal ignition apparatus is surrounded by the heat dissipation plate, the heat dissipation plate is generally U-shaped in cross section perpendicular to a longitudinal axial direction of the electrothermal ignition apparatus, the heat dissipation plate includes an air blocking wall having two ends, the air blocking wall being provided in a downstream part in the cooling air passage, a sidewall extending from each of the two ends of the air blocking wall toward an upstream part in the cooling air passage, and
   a ventilation entrance opened throughout a whole area between the ends of the extending portions of the two sidewalls.

2. The exhaust treatment apparatus for an engine according to claim 1, wherein both sidewalls are provided with air discharging ports.

3. The exhaust treatment apparatus for an engine according to claim 2, further comprising a power input terminal provided on the outer projecting portion of the electrothermal ignition apparatus, wherein a connection terminal of a power feeder cord is connected to the power input terminal, and the connection terminal of the power feeder cord is surrounded, together with the outer projecting portion of the electrothermal ignition apparatus, by the heat dissipation plate.

4. The exhaust treatment apparatus for an engine according to claim 1, further comprising a power input terminal provided on the outer projecting portion of the electrothermal ignition apparatus, wherein a connection terminal of a power feeder cord is connected to the power input terminal, and the connection terminal of the power feeder cord is surrounded, together with the outer projecting portion of the electrothermal ignition apparatus, by the heat dissipation plate.

5. An exhaust treatment apparatus for an engine comprising:
a wall;
an exhaust passage;
an oxidation catalyst disposed in the exhaust passage;
a combustible gas generator;
a combustible gas supplying passage;
a cooling air passage;
a heat dissipation port opened upstream in the exhaust passage from the oxidation catalyst and in a downstream part in the combustible gas supplying passage, the exhaust passage and the combustible gas supplying passage communicating with each other through the heat dissipation port; and
an electrothermal ignition apparatus having an outer projecting portion and disposed in the combustible gas supplying passage, wherein heat of flaming combustion of combustible gas ignited by the electrothermal ignition apparatus is supplied to the exhaust passage, to raise a temperature of exhaust in the exhaust passage,
the exhaust treatment apparatus for an engine further comprising:
a heat dissipation plate attached to an outer projecting portion of the electrothermal ignition apparatus, the outer projecting portion projecting outside the wall of the exhaust treatment apparatus,
wherein the heat dissipation plate is disposed in the cooling air passage, the outer projecting portion of the electrothermal ignition apparatus is surrounded by the heat dissipation plate, the heat dissipation plate includes an air blocking wall having two ends, the air blocking wall being provided in a downstream part in the cooling air passage, a sidewall extending from each of the two ends of the air blocking wall toward an upstream part in the cooling air passage,
a ventilation entrance opened throughout a whole area between the ends of the extending portions of the two sidewalls,
a ventilation clearance formed at the wall of the exhaust treatment apparatus into which the electrothermal ignition apparatus is inserted,
wherein the electrothermal ignition apparatus includes an insert portion inserted into the wall of the exhaust treatment apparatus, part of the insert portion being exposed in the ventilation clearance, the ventilation clearance being disposed in the cooling air passage, and
wherein the electrothermal ignition apparatus is inserted into the wall of the exhaust treatment apparatus along an axial direction of the electrothermal ignition apparatus, and the wall of the exhaust treatment apparatus includes a ventilation clearance extending along a ventilation direction of the cooling air passage, the ventilation direction being orthogonal to the axial direction of the electrothermal ignition apparatus, and the ventilation clearance being formed between mutually-opposing portions of the wall of the exhaust treatment apparatus, and the mutually-opposing portions having surfaces that face each other and are exposed in the ventilation clearance.

6. The exhaust treatment apparatus for an engine according to claim 5, wherein the heat dissipation plate is generally U-shaped in cross section.

7. An exhaust treatment apparatus for an engine comprising:
a wall;
an exhaust passage;
an oxidation catalyst disposed in the exhaust passage;
a combustible gas generator;
a combustible gas supplying passage;
a cooling air passage;
a heat dissipation port opened upstream in the exhaust passage from the oxidation catalyst and in a downstream part in the combustible gas supplying passage, the exhaust passage and the combustible gas supplying passage communicating with each other through the heat dissipation port; and
an electrothermal ignition apparatus having an outer projecting portion and disposed in the combustible gas supplying passage, wherein heat of flaming combustion of combustible gas ignited by the electrothermal ignition apparatus is supplied to the exhaust passage, to raise a temperature of exhaust in the exhaust passage,
the exhaust treatment apparatus for an engine further comprising:
a heat dissipation plate attached to an outer projecting portion of the electrothermal ignition apparatus, the outer projecting portion projecting outside the wall of the exhaust treatment apparatus,
a ventilation clearance formed at the wall of the exhaust treatment apparatus into which the electrothermal ignition apparatus is inserted,
wherein the electrothermal ignition apparatus includes an insert portion inserted into the wall of the exhaust treatment apparatus, part of the insert portion being exposed in the ventilation clearance, the ventilation clearance being disposed in the cooling air passage, and
wherein the electrothermal ignition apparatus is inserted into the wall of the exhaust treatment apparatus along an axial direction of the electrothermal ignition apparatus, and the wall of the exhaust treatment apparatus includes a ventilation clearance extending along a ventilation direction of the cooling air passage, the ventilation direction being orthogonal to the axial direction of the electrothermal ignition apparatus, and the ventilation clearance being formed between mutually-opposing portions of the wall of the exhaust treatment apparatus, and the mutually-opposing portions having surfaces that face each other and are exposed in the ventilation clearance.

8. The exhaust treatment apparatus for an engine according to claim 7, wherein the heat dissipation plate is disposed in the cooling air passage, the outer projecting portion of the electrothermal ignition apparatus is surrounded by the heat dissipation plate, the heat dissipation plate is generally U-shaped in cross section perpendicular to a longitudinal axial direction of the electrothermal ignition apparatus, the heat dissipation plate includes an air blocking wall having two ends, the air blocking wall being provided in a downstream part in the cooling air passage, a sidewall extending from each of the two ends of the air blocking wall toward an upstream part in the cooling air passage, and both sidewalls are provided with air discharging ports.

9. The exhaust treatment apparatus for an engine according to claim 8, further comprising a power input terminal provided on the outer projecting portion of the electrothermal ignition apparatus, wherein a connection terminal of a power feeder cord is connected to the power input terminal, and the connection terminal of the power feeder cord is surrounded, together with the outer projecting portion of the electrothermal ignition apparatus, by the heat dissipation plate.

10. The exhaust treatment apparatus for an engine according to claim 7, further comprising a power input terminal provided on the outer projecting portion of the electrothermal ignition apparatus, wherein a connection terminal of a power feeder cord is connected to the power input terminal, and the connection terminal of the power feeder cord is surrounded, together with the outer projecting portion of the electrothermal ignition apparatus, by the heat dissipation plate.

\* \* \* \* \*